(12) United States Patent
Yang et al.

(10) Patent No.: US 7,336,503 B2
(45) Date of Patent: Feb. 26, 2008

(54) FASTENING MECHANISM FOR ELECTRONIC DEVICE

(75) Inventors: Yung-Chi Yang, Taipei (TW); You-Fa Luo, Taipei (TW)

(73) Assignee: Inventec Corporation, Shih-Lin District, Taipei (TW)

( * ) Notice: Subject to any disclaimer, the term of this patent is extended or adjusted under 35 U.S.C. 154(b) by 6 days.

(21) Appl. No.: 11/395,562

(22) Filed: Mar. 31, 2006

(65) Prior Publication Data

US 2007/0008690 A1 Jan. 11, 2007

(30) Foreign Application Priority Data

Jul. 11, 2005 (TW) ............... 94211713 U

(51) Int. Cl.
*H05K 7/14* (2006.01)
(52) U.S. Cl. .................... 361/801; 361/802
(58) Field of Classification Search ........ 361/801, 361/802, 755, 740
See application file for complete search history.

(56) References Cited

U.S. PATENT DOCUMENTS

| 6,144,552 | A * | 11/2000 | Whitcher et al. | 361/681 |
| 6,850,413 | B2 * | 2/2005 | Amie et al. | 361/737 |
| 2005/0146857 | A1 * | 7/2005 | Finneman et al. | 361/740 |
| 2006/0209522 | A1 * | 9/2006 | Yang et al. | 361/801 |
| 2006/0279942 | A1 * | 12/2006 | Yasuda | 361/796 |

* cited by examiner

*Primary Examiner*—Tuan T. Dinh
*Assistant Examiner*—Yuriy Semenenko
(74) *Attorney, Agent, or Firm*—Fulbright & Jaworski

(57) ABSTRACT

A fastening mechanism for an electronic device for connecting upper and lower casings of an electronic device, includes: a side frame member including an exposed surface, a first surface and an opposing second surface; a wedging portion formed on the first surface, for being coupled with a protruding edge formed on the upper casing; a stopping portion formed on the second surface, for abutting against an edge of the lower casing; and at least one locking portion formed on the side frame member, and extended toward a direction opposed to the exposed surface so as to further fasten the upper casing, the side frame member and the lower casing by means of a locking element, making the upper casing, the exposed surface of the side frame member and the lower casing form a case of the electronic device.

14 Claims, 4 Drawing Sheets

FASTENING MECHANISM FOR ELECTRONIC DEVICE

BACKGROUND OF THE INVENTION

1. Field of the Invention

The present invention relates to fastening mechanisms for electronic devices, and more particularly, to a fastening mechanism for fastening side casings of a notebook PC.

2. Description of the Related Art

The use of notebook type PCs has become commonplace and popular. As such, designs of consumer electronic devices gradually become a key factor in marketing. FIGS. 4A and 4B depict the design of side frames that holds the casing of a conventional notebook PC and this part is exemplified by a keyboard module of the notebook PC, wherein FIG. 4A is a schematic view showing the upper and lower casings 60, 61 of the keyboard module assembled with and the side frame 65, and FIG. 4A is a schematic view of a complete unit after assembly.

The prior art design is implemented by disposing a preset printing circuit board and computer elements in between the upper and lower casings 60, 61 of the keyboard module that are to be combined and assembled together. Also, three side frames 65 are used to respectively connect three sides of the keyboard module by means of a hooking member disposed on side frames 65, thereby fastening the upper and lower casings 60, 61 of the keyboard module and protecting the printing circuit board and computer elements installed therein.

Since such prior art design employs hooking means for assembly, when a user intends to disassemble the keyboard module for the purposes of maintenance or replacements of spare parts, it has to be done in a reverse and similar manner so as to loosen the bonding of three side frames by releasing hooking members, which is not only laborious and inconvenient, but is also likely to cause distortion or breakage of the hooking members due to inappropriate forces exerted that may lead to defective side frames as a result. Besides, if these side frames have been assembled and disassembled many times, the hooking members thereof suffer a lot of wear and tear due to the strength and pressure exerted and the reliability and life span of usage is decreased.

Moreover, such a side frame design is also inherent with the drawback of insecurity. Thus it often necessitates addition of other fastening mechanisms to reinforce the connection between side frames, further inconveniencing assembling and disassembling of side frames, which cannot satisfy the demands of most consumers in practical use and has posed a challenge and bottleneck to designers of electronic devices.

Therefore, there exists a need to develop a novel fastening mechanism that can improve on the drawbacks of prior art techniques to thereby allow the users to conveniently assemble and disassemble side frames of a notebook PC at ease.

SUMMARY OF THE INVENTION

The present invention aims to eliminate the aforementioned drawbacks, and, as such, a primary objective of the present invention is to provide a fastening mechanism that can facilitate assembly and disassembly of side frame casings of an electronic device.

Another objective of the present invention is to provide a fastening mechanism that can securely fasten side frames of an electronic device.

Another objective of the present invention is to provide a fastening mechanism that has high reliability in fastening side frames of an electronic device.

Another objective of the present invention is to provide a fastening mechanism that can avoid damages to structures in assembly and disassembly of side frames of an electronic device.

In order to achieve the above and other objectives, the present invention provides a fastening mechanism for fastening upper and lower casings of an electronic device, the fastening mechanism comprising: a side frame member, comprising an exposed surface, a first surface and an opposing second surface; a wedging portion formed on the first surface, for being coupled with a protruding edge formed on the upper casing; a stopping portion formed on the second surface, for abutting against an edge of the lower casing; and a plurality of locking portions formed on the side frame member, which extend toward a direction opposed to the exposed surface so as to further fasten the upper casing, the side frame member and the lower casing by means of locking elements, thereby making the upper casing, the exposed surface of the side frame member and the lower casing form a case of the electronic device.

The locking portion mentioned above can be a protruding portion having screw bores, and the locking element can be a screw. Further, the shape of the wedging portion is made to match that of the protruding edge of the upper casing, while the shape of the stopping portion is made to match the edge of the lower casing, thereby restricting free movements of the side frame members for immobilization.

Accordingly, after the electronic device such as the keyboard module of a note book PC is assembled, the wedging portion, the stopping portion, and the locking portion are positioned inside of the electronic device.

The present invention employs the design of the wedging portion and the stopping portion formed on side frame members to thereby restrict the free movements of the side frame members, further using the locking portion to provide immobilization. Thus, the fastening mechanism according to the invention not only is convenient and easy to assemble, disassemble and fasten securely, but also is not laborious to implement and accomplish. Accordingly, the present invention offers advantages over the prior art techniques in that it has high reliability in achieving immobilization without causing damages to structures due to inappropriate forces exerted.

BRIEF DESCRIPTION OF DRAWINGS

The fastening mechanism of the present invention can be fully understood by reading the following detailed description of the preferred embodiments, with reference made to the accompanying drawings, wherein.

DETAILED DESCRIPTION OF PREFERRED EMBODIMENT

Figure 1A:
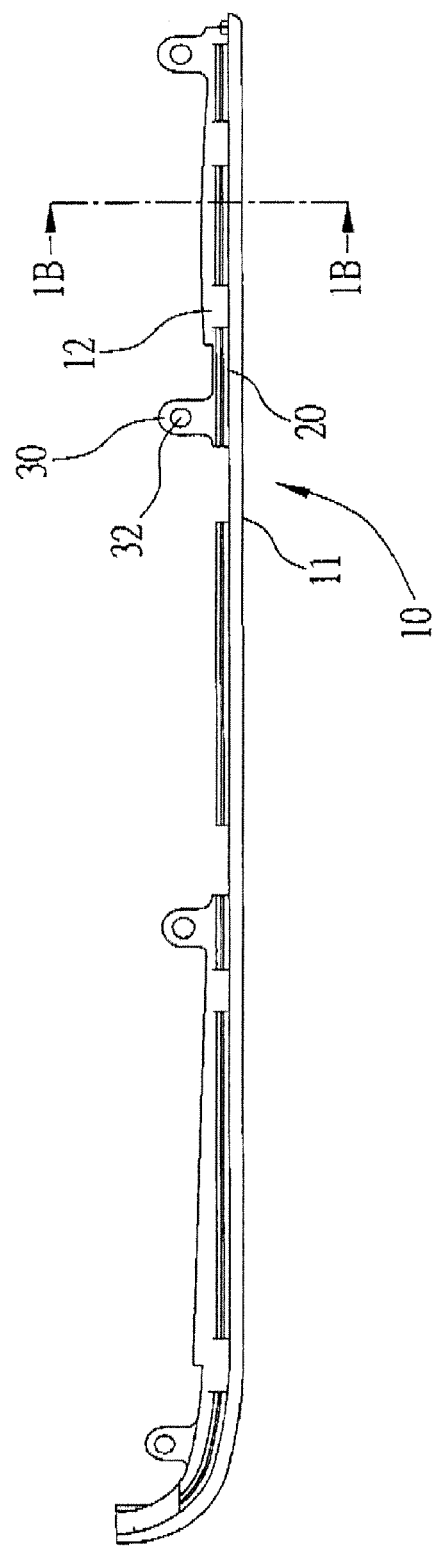
FIGS. 1A and 1B are schematic views showing a preferred embodiment of the fastening mechanism according to the present invention.
Figure 1B:
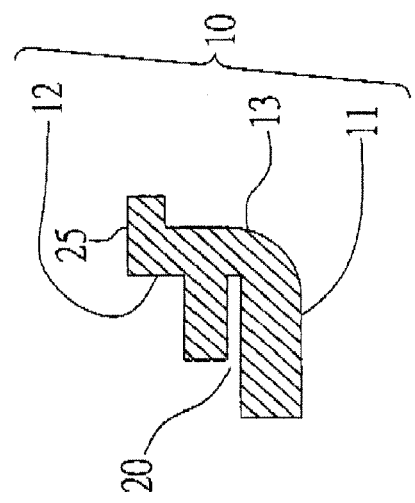

FIGS. 1A and 1B depict a preferred embodiment of the fastening mechanism for fastening side frames of an electronic device of the present invention, the fastening mechanism at least being comprised of: a side frame member 10, which is consisted of an exposed surface 11, a first surface 12 and an opposing second surface 13; a plurality of wedging portions 20 is formed on the first surface 12 and extending along the first surface 12 for coupling with a protruding edge 41 formed on the upper casing 40 via the wedging portion 20; a plurality of stopping portions 25 is formed on the second surface 13 and extending along the second surface 13 to tightly abut against an edge 51 of the lower casing 50 to achieve immobility. Further, as shown in FIG. 1A, a plurality of locking portions 30 of protrusion shape is formed on the side frame member 10, the plurality of locking portions 30 extend toward the direction opposed to the exposed surface 11, and each of the locking portion 30 is formed with a locking bore 32, allowing a locking element 31 to penetrate through the upper casing 40, the locking portion 30, and the lower casing 50 for fastening by means of a locking element 31, such that the upper casing 40, the exposed surfaces 11 of the side frame member 10, and the lower casing 50 become the casings of the electronic device.

The locking portion mentioned above can be a protruding portion having screw bores, and the locking element can be a screw. Further, the shape of the wedging portion is made to match that of the protruding edge of the upper casing, while the shape of the stopping portion is made to match the edge of the lower casing, thereby restricting free movements of the side frame members for immobilization.

Accordingly, after the electronic device such as the keyboard module of a note book PC is assembled, the wedging portion, the stopping portion, and the locking portion are positioned inside of the interior of the electronic device.

The present invention employs the design of the wedging portion and the stopping portion formed on side frame members to thereby restrict the free movements of the side frame members, further using the locking portion to provide immobilization. Thus, the fastening mechanism according to the invention not only is convenient and easy to assemble, disassemble and fasten securely, but also is not laborious to implement and accomplish. Accordingly, the present invention offers advantages over the prior art techniques in that it has high fastening reliability without causing damages to structures due to inappropriate forces exerted.

Figure 2:
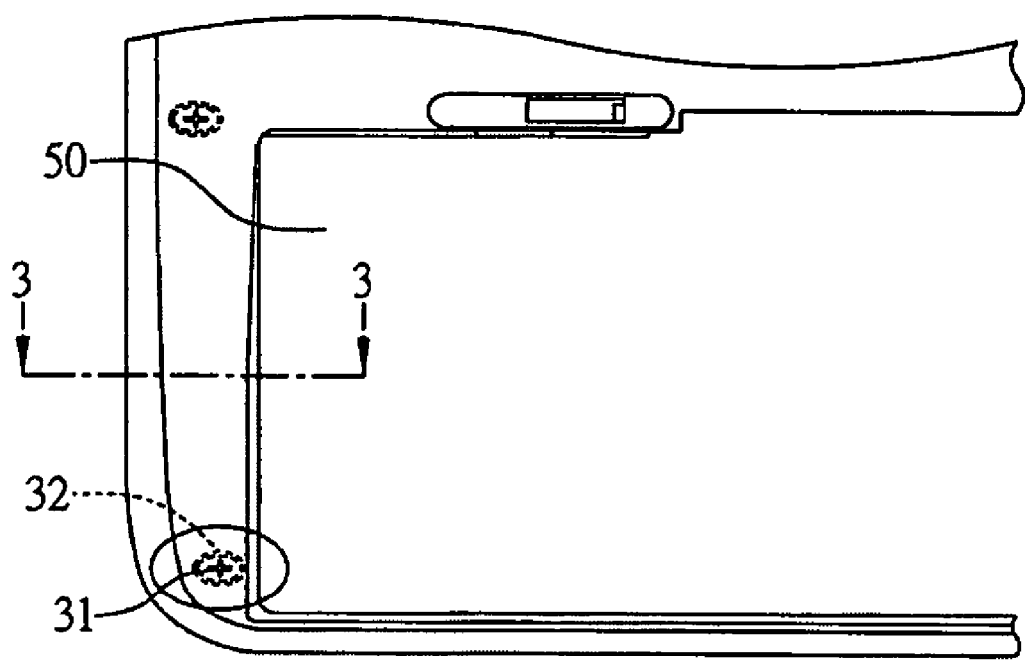
FIG. 2 is a bottom view showing the upper and lower casing of an electronic device assembled by the fastening mechanism according to the present invention.
Figure 3:
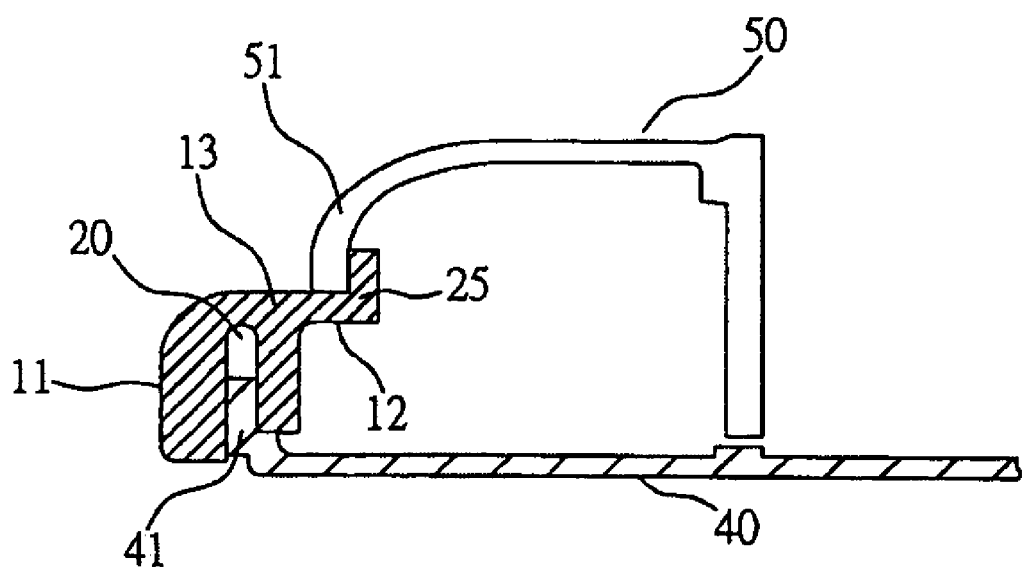
FIG. 3 is a sectional view showing the upper and lower casing of an electronic device assembled by the fastening mechanism according to the present invention.
Figure 4A:
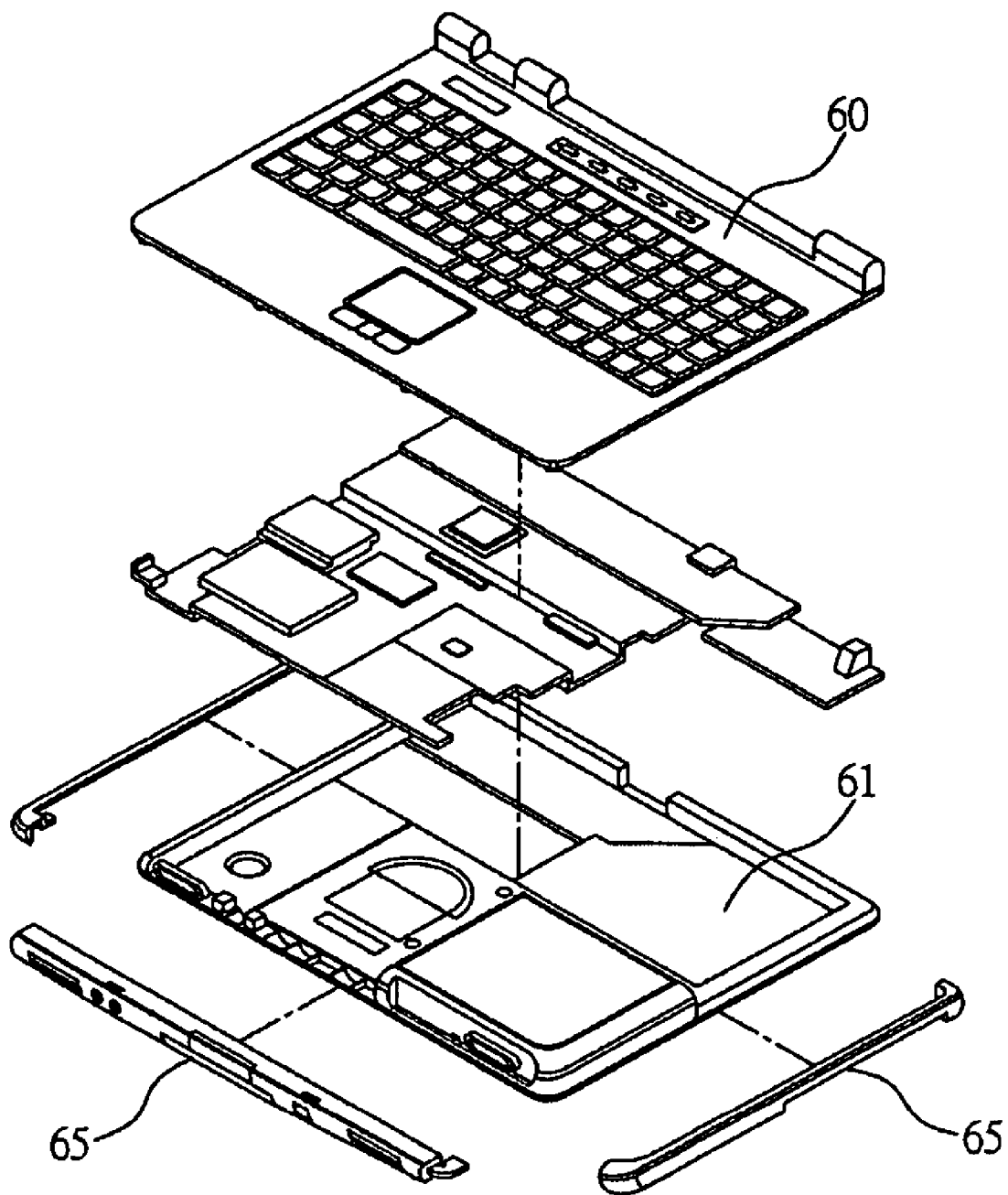
FIGS. 4A and 4B are schematic views showing the design of side frames constituting a conventional notebook PC.
Figure 4B:
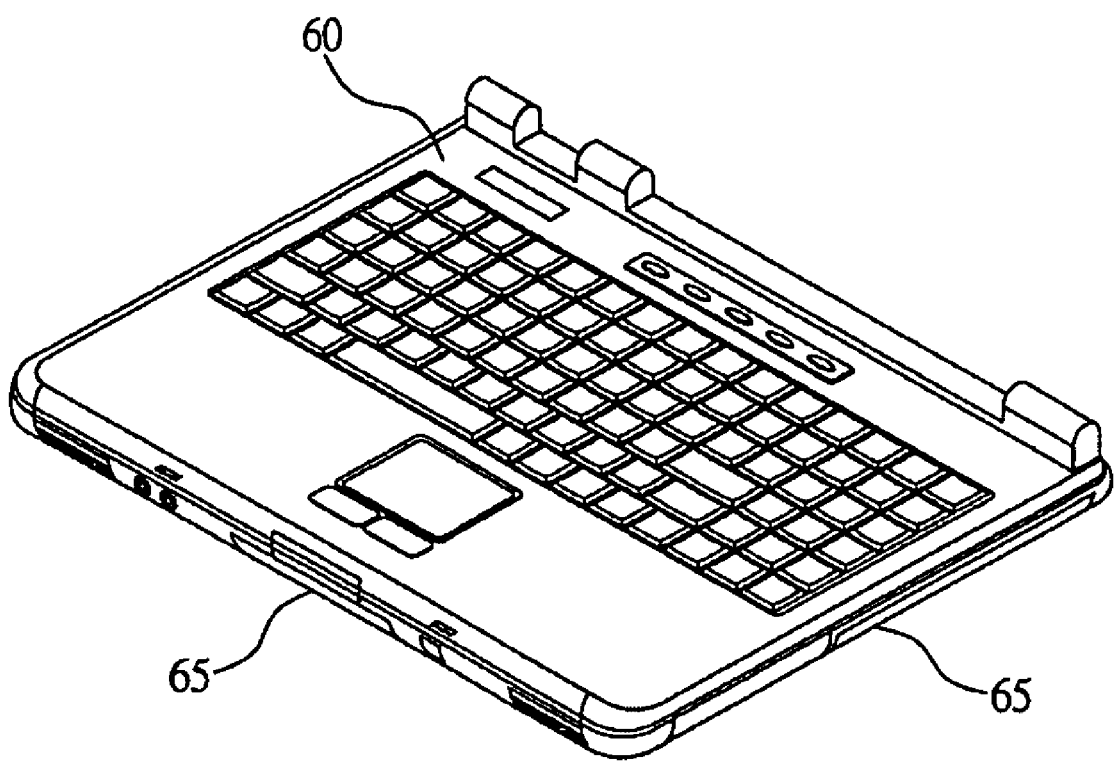

FIGS. 2 and 3 depict more clearly the connection relation between side frame member 10 and the upper casing 40, the lower casing 50 of the electronic device. Viewing from the bottom view of FIG. 2, the position of a locking element (screw) penetrating the lower casing 50 of the electronic device is shown; and viewing from a sectional view of FIG. 3, an edge of the upper casing 40 has a protruding edge 41, and the shape of the wedging portion 20 is made to match that of the protruding edge 41, thereby limiting movements of the frame member 10 in both lateral and longitudinal directions. Correspondingly, the lower casing 50 has an arch edge 51, and the shape of the stopping portion 25 is made to match that of the arch edge 51 so as to abut against the inner side of the arch edge 51, thereby limiting movements of the frame member 10 in a left-hand side direction and an upward direction.

The shape of the foregoing wedging portion 20 and the stopping portion 25 is variable depending on the upper casing 40 and the lower casing 50 of the electronic device, so long as the interconnection relation that it provides can effectively limit movements of the frame member 10. In this embodiment, for example, the exposed surface 11 of side frame member 10 becomes a part of the wedging portion 20 but is not limited to such.

Accordingly, after the electronic device is fastened and assembled, the upper casing 40, the exposed surface 11 of side frame member 10, and the lower casing 50 become the casing of the electronic device, whereas the wedging portion 20, the stopping portion 25, and the locking portion 30 of side frame member 10 are located inside of the electronic device.

In this embodiment, the electronic device is a keyboard module of a notebook PC, therefore after assembly, a preformed printing circuit board and computer elements are disposed in between the upper casing 40 and the lower casing 50; also, the upper casing 40 is further provided with a keyboard button while the lower casing is installed with batteries.

By the provision of the wedging portion and the stopping portion formed on the side frame members to limit movements of the side frame members, as well as the locking portion to lock securely, the fastening mechanism of the invention offers advantages over the prior art techniques in that it has high fastening reliability without causing damages to structures due to inappropriate forces exerted.

The aforementioned are only exemplary preferred embodiments of the present invention. The scope of the claims as stated below should be accorded the broadest interpretation so as to encompass various modifications and similar arrangements made to the herein described invention that fall within the spirit of the basic principles and technology of the present invention.

What is claimed is:

1. A fastening mechanism for an electronic device, for connecting an upper casing and a lower casing of the electronic device, the fastening mechanism comprising:
   a side frame member comprising an exposed surface, a first surface and an opposing second surface;
   a wedging portion formed on the first surface, for receiving a protruding edge formed on the upper casing;
   a stopping portion formed on the second surface, for abutting against an edge of the lower casing; and
   at least one locking portion formed on the side frame member and extended toward a direction opposed to the exposed surface, so as to further fasten the upper casing, the side frame member and the lower casing by means of a locking element, thereby making the upper casing, the exposed surface of the side frame member and the lower casing form a case of the electronic device.

2. The fastening mechanism for an electronic device of claim 1, wherein the locking element penetrates the upper casing, the locking portion, and the lower casing of the electronic device.

3. The fastening mechanism for an electronic device of claim 1, wherein the locking portion is a protruding portion formed with a screw bore, and the locking element is a screw.

4. The fastening mechanism for an electronic device of claim 1, wherein the wedging portion extended along the first surface.

5. The fastening mechanism for an electronic device of claim 1, wherein the wedging portion has a shape matching the protruding edge formed on the upper casing.

6. The fastening mechanism for an electronic device of claim 1, wherein the stopping portion extended along the second surface.

7. The fastening mechanism for an electronic device of claim 1, wherein the stopping portion has a shape matching the edge of the lower casing.

8. The fastening mechanism for an electronic device of claim 1, wherein the exposed surface is a part of the wedging portion.

9. The fastening mechanism for an electronic device of claim 1, wherein after assembly of the electronic device, the wedging portion is located inside of the electronic device.

10. The fastening mechanism for an electronic device of claim 1, wherein after assembly of the electronic device, the stopping portion is located inside of the electronic device.

11. The fastening mechanism for an electronic device of claim 1, wherein after assembly of the electronic device, the locking portion is located inside of the electronic device.

12. The fastening mechanism for an electronic device of claim 1, wherein after assembly of the electronic device, a printing circuit board is disposed between the upper casing and the lower casing of the electronic device.

13. The fastening mechanism for an electronic device of claim 1, wherein after assembly of the electronic device, a plurality of computer elements are disposed between the upper casing and the lower casing of the electronic device.

14. The fastening mechanism for an electronic device of claim 1, wherein the electronic device is a keyboard module of a notebook computer.

* * * * *